(12) United States Patent
Koshimae

(10) Patent No.: US 11,070,547 B2
(45) Date of Patent: Jul. 20, 2021

(54) ELECTRONIC CONTROL DEVICE, A COMMUNICATION MANAGEMENT METHOD PERFORMABLE AND A NON-TRANSITORY STORAGE MEDIUM CONFIGURED TO RESTRICT PREDETERMINED COMMUNICATION IN AN IN-VEHICLE NETWORK

(71) Applicant: TOYOTA JIDOSHA KABUSHIKI KAISHA, Toyota (JP)

(72) Inventor: Naoya Koshimae, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 344 days.

(21) Appl. No.: 16/125,166

(22) Filed: Sep. 7, 2018

(65) Prior Publication Data

US 2019/0132311 A1    May 2, 2019

(30) Foreign Application Priority Data

Oct. 26, 2017  (JP) .............................. JP2017-207250

(51) Int. Cl.
*H04L 29/06* (2006.01)
*G06F 21/44* (2013.01)

(52) U.S. Cl.
CPC ........ *H04L 63/0853* (2013.01); *G06F 21/445* (2013.01); *H04L 63/06* (2013.01)

(58) Field of Classification Search
CPC .... H04L 63/0853; H04L 63/06; G06F 21/445
See application file for complete search history.

(56) References Cited

U.S. PATENT DOCUMENTS 9,373,239 B2 * 6/2016 Ebe ..................... G08B 21/24
2006/0175900 A1 * 8/2006 Ono ..................... B60R 25/209
                                                              307/10.1

(Continued)

FOREIGN PATENT DOCUMENTS

| CN | 1815011 A | 8/2006 |
| JP | 2002094535 A | 3/2002 |
| WO | 2013038478 A1 | 3/2013 |

OTHER PUBLICATIONS

M. Barnasconi et al., "UVM-SystemC-AMS Framework for System-Level Verification and Validation of Automotive Use Cases," in IEEE Design & Test, vol. 32, No. 6, pp. 76-86, Dec. 2015, doi: 10.1109/MDAT.2015.2427260. (Year: 2015).*

(Continued)

*Primary Examiner* — Mahfuzur Rahman
*Assistant Examiner* — Richard W Cruz-Franqui
(74) *Attorney, Agent, or Firm* — Hunton Andrews Kurth LLP

(57) ABSTRACT

An electronic control device, a communication management method performable, and a non-transitory storage medium storing a program are disclosed. The electronic control device is connected to an in-vehicle network and is configured to restrict predetermined communication in the in-vehicle network. The electronic control device includes a key connection unit configured to accept connection of a key device, a key verification unit configured to verify the key device connected to the key connection unit, and a function controller configured to permit the predetermined communication in the in-vehicle network when the verification of the key device using the key verification unit succeeds.

10 Claims, 7 Drawing Sheets

(56) References Cited

U.S. PATENT DOCUMENTS

| | | | |
|---|---|---|---|
| 2014/0163810 A1* | 6/2014 | Roettger | H04L 12/40006 701/32.7 |
| 2014/0196114 A1* | 7/2014 | Hirashima | G06F 21/445 726/4 |
| 2015/0163660 A1* | 6/2015 | Hayashi | H04M 3/2218 455/420 |
| 2015/0254963 A1* | 9/2015 | Kakinuma | B60Q 5/005 340/457 |
| 2016/0135038 A1* | 5/2016 | Ochiai | B60R 25/01 370/338 |
| 2019/0020717 A1* | 1/2019 | Carlesimo | B60W 50/00 |
| 2019/0132311 A1* | 5/2019 | Koshimae | H04L 63/06 |
| 2019/0245691 A1* | 8/2019 | Takemori | H04L 9/08 |
| 2019/0349394 A1* | 11/2019 | Kishikawa | H04L 63/062 |
| 2020/0044842 A1* | 2/2020 | Usui | H04L 63/068 |

OTHER PUBLICATIONS

S. Woo, H.J. Jo and D. H. Lee, "A Practical Wireless Attack on the Connected Car and Security Protocol for In-Vehicle CAN," in V IEEE Transactions on Intelligent Transportation Systems, vol. 16, No. 2, pp. 993-1006, Apr. 2015, doi: 10.1109/TITS.2014.2351612 (Year: 2015).*

NPL Search (Google Scholar) (Year: 2021).*

* cited by examiner

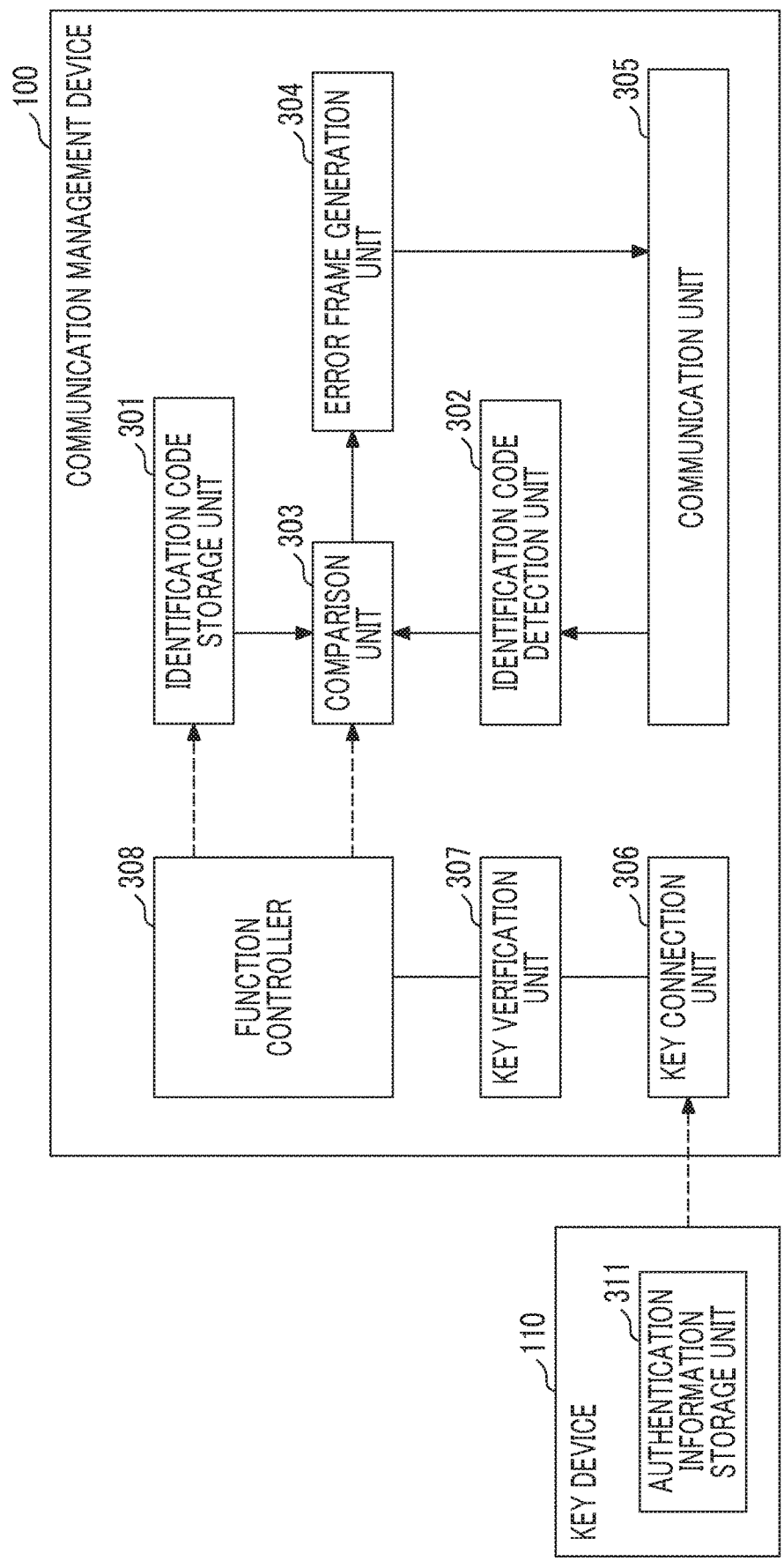

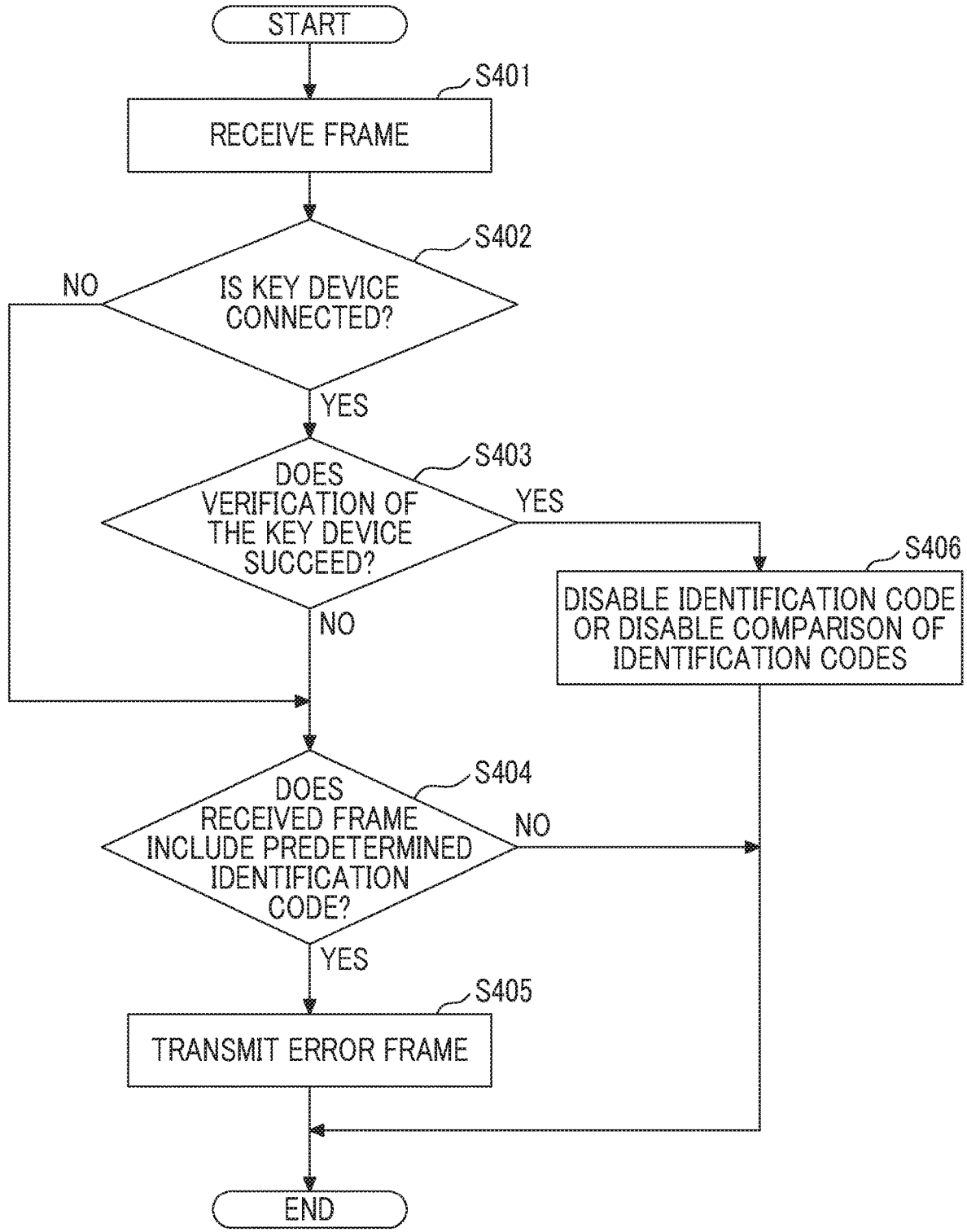

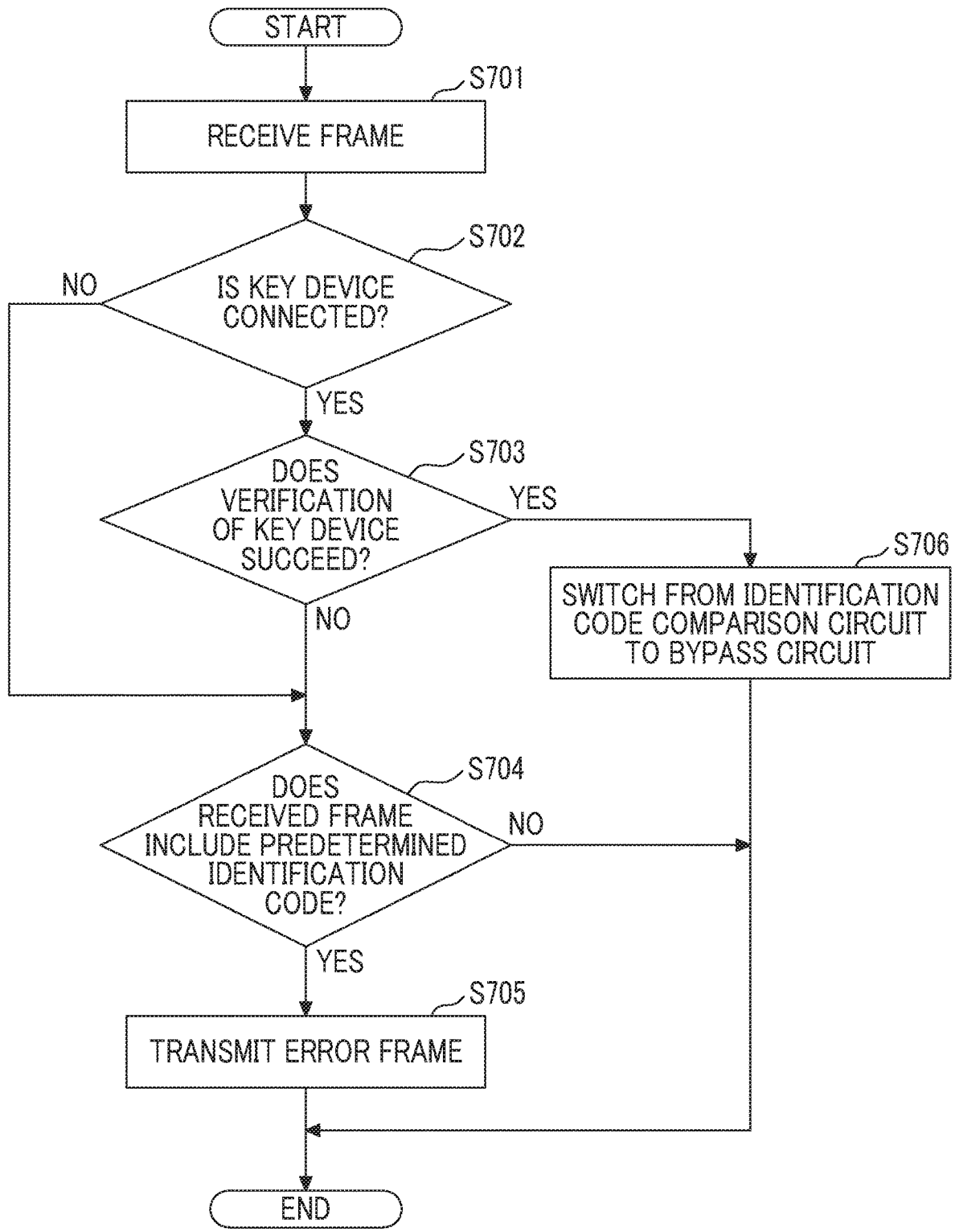

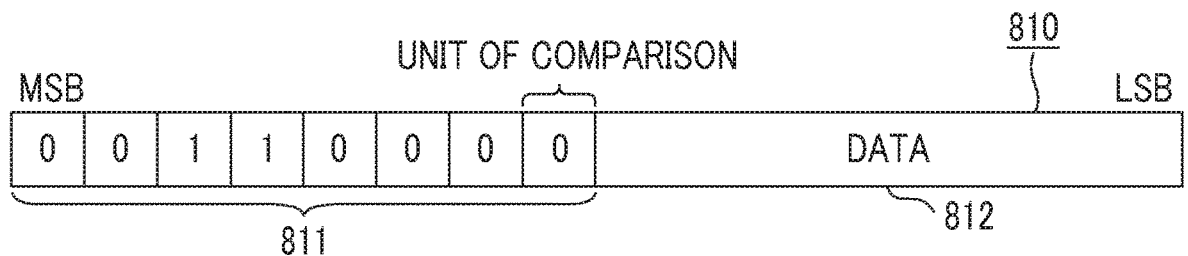

ELECTRONIC CONTROL DEVICE, A COMMUNICATION MANAGEMENT METHOD PERFORMABLE AND A NON-TRANSITORY STORAGE MEDIUM CONFIGURED TO RESTRICT PREDETERMINED COMMUNICATION IN AN IN-VEHICLE NETWORK

INCORPORATION BY REFERENCE

The disclosure of Japanese Patent Application No. 2017-207250 filed on Oct. 26, 2017 including the specification, drawings and abstract is incorporated herein by reference in its entirety.

BACKGROUND

1. Technical Field

The disclosure relates to an electronic control device, a communication management method, and a non-transitory storage medium storing a program.

2. Description of Related Art

A technology that restricts communication using an external device connected to an in-vehicle network in the in-vehicle network installed on a vehicle such as an automobile has been known.

For example, a system that includes a relay apparatus which relays communication between an external device and an in-vehicle local area network (LAN), and controls the relay apparatus such that the communication between the external device and the in-vehicle LAN is permitted solely when an authentication system authenticates the external device has been known (for example, see WO 2013/038478).

A technology that outputs an error code to a network when a communication frame including an identification code stored in advance is detected in the network in which a message with an identification code is communicated between a plurality of modules has been known (for example, see Japanese Unexamined Patent Application Publication No. 2002-94535 (JP 2002-94535 A)).

SUMMARY

In the technology disclosed in WO 2013/038478, since communication with the external device is permitted by the relay apparatus, there is a problem that it is difficult to restrict the communication with the external device on a communication path without using the relay apparatus. In the aforementioned system, it may be difficult to restrict communication using an unauthorized external device in a case where the unauthorized external device is directly connected to the in-vehicle LAN other than the relay apparatus, for example.

Meanwhile, in the technology disclosed in JP 2002-94535 A, since the error code is output for the communication frame including the identification code stored in advance, it is possible to restrict the communication using the unauthorized external device performed by using the identification code even on the communication path without using the relay apparatus. However, in the aforementioned method, the communication using the authorized external device that performs communication by using the identification code is also restricted.

Embodiments of the disclosure can permit communication using an authorized external device while restricting communication using an unauthorized external device even on a communication path without using a relay apparatus in an in-vehicle network.

A first aspect of the disclosure provides an electronic control device that is connected to an in-vehicle network and is configured to restrict predetermined communication in the in-vehicle network. The electronic control device includes a key connection unit configured to accept connection of a key device, a key verification unit configured to verify the key device connected to the key connection unit, and a function controller configured to permit the predetermined communication in the in-vehicle network when the verification of the key device using the key verification unit succeeds.

According to the first aspect, the electronic control device accepts the connection of the key device, and permits the predetermined communication in the in-vehicle network when the verification of the key device succeeds. Accordingly, the electronic control device can permit the predetermined communication using the authorized user having the key device while restricting the communication using an unauthorized external device which is connected to the in-vehicle network by an unauthorized user.

In the electronic control device according to the first aspect of the disclosure, the key device may be configured to permit communication using an external device connected to the in-vehicle network.

According to the above configuration, the electronic control device can permit the communication using the authorized external device which is connected to the in-vehicle network by the authorized user having the key device.

In the electronic control device according to the first aspect of the disclosure, the key device may be configured to permit the predetermined communication corresponding to the key device among communications using an external device connected to the in-vehicle network.

According to the above configuration, the electronic control device can permit the predetermined communication among the communications using the authorized external device which is connected to the in-vehicle network by the authorized user having the key device.

In the electronic control device according to the first aspect of the disclosure, the predetermined communication may include XCP communication.

According to the above configuration, the electronic control device can permit the XCP communication among the communications using the authorized external device which is connected to the in-vehicle network by the authorized user having the key device.

The electronic control device according to the first aspect of the disclosure may further include a reception unit configured to receive a communication frame transmitted to the in-vehicle network, and a generation unit configured to generate an error in the communication frame when an identification code corresponding to the predetermined communication is included in the communication frame. The function controller may be configured to stop the generation of the error using the generation unit when the verification of the key device using the key verification unit succeeds.

According to the above configuration, the electronic control device can restrict the predetermined communication by generating the error in the communication frame including the identification code corresponding to the predetermined communication. The electronic control device can cancel the restriction of the predetermined communication by stopping the generation of the error in the communication frame including the identification code corresponding to the predetermined communication when the authorized key device is connected.

The electronic control device according to the first aspect of the disclosure may further include a comparison unit configured to compare the identification code included in the communication frame received by the reception unit with the identification code corresponding to the predetermined communication, and output a result of the comparison to the generation unit. The function controller may be configured to disable the comparison of the identification codes using the comparison unit when the verification of the key device using the key verification unit succeeds.

According to the above configuration, the electronic control device can easily cancel the restriction of the predetermined communication by controlling such that the function of the comparison unit is enabled or disabled.

In the electronic control device according to the first aspect of the disclosure, the key device may include a bypass circuit configured to bypass determination using the comparison unit, and the function controller may be configured to enable the bypass circuit when the verification of the key device using the key verification unit succeeds.

According to the above configuration, the electronic control device can disable the comparison of the identification codes using the comparison unit by using a logic circuit.

The electronic control device according to the first aspect of the disclosure may further include an identification code storage unit that stores an identification code corresponding to the predetermined communication. The function controller may be configured to disable at least a part of identification codes stored in the identification code storage unit when the verification of the key device using the key verification unit succeeds.

According to the above configuration, the electronic control device can permit the predetermined communication performed by using at least a part of the identification codes stored in the identification code storage unit when the authorized key device is connected.

A second aspect of the disclosure provides a communication management method performable by an electronic control device that is connected to an in-vehicle network and restricts predetermined communication in the in-vehicle network. The communication management method includes verifying a key device connected to a key connection unit of the electronic control device when the key device is connected to the key connection unit, and permitting the predetermined communication in the in-vehicle network when the verification of the key device connected to the key connection unit succeeds.

A third aspect of the disclosure provides a non-transitory storage medium storing a program executable by an electronic control device which is connected to an in-vehicle network and is configured to restrict predetermined communication in the in-vehicle network. The program includes logic to verify a key device connected to a key connection unit of the electronic control device when the key device is connected to the key connection unit, and logic to permit the predetermined communication in the in-vehicle network when the verification of the key device connected to the key connection unit succeeds.

According to the aspects of the disclosure, it is possible to permit communication using an authorized external device while restricting communication using an unauthorized external device even on a communication path without using a relay apparatus in an in-vehicle network.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram showing an example of a functional configuration of the communication management device according to the first embodiment;

FIG. 4 is a flowchart showing a flow of processing of the communication management device according to the first embodiment;

FIG. 7 is a flowchart showing a flow of processing of the communication management device according to the second embodiment;

FIG. 8A is a table for describing an identification code according to the second embodiment;

FIG. 8B is a table for describing the identification code according to the second embodiment; and FIG. 8C is a table for describing the identification code according to the second embodiment.

DETAILED DESCRIPTION OF EMBODIMENTS

Hereinafter, modes for carrying out the disclosure will be described with reference to the drawings.

System Configuration

Figure 1:
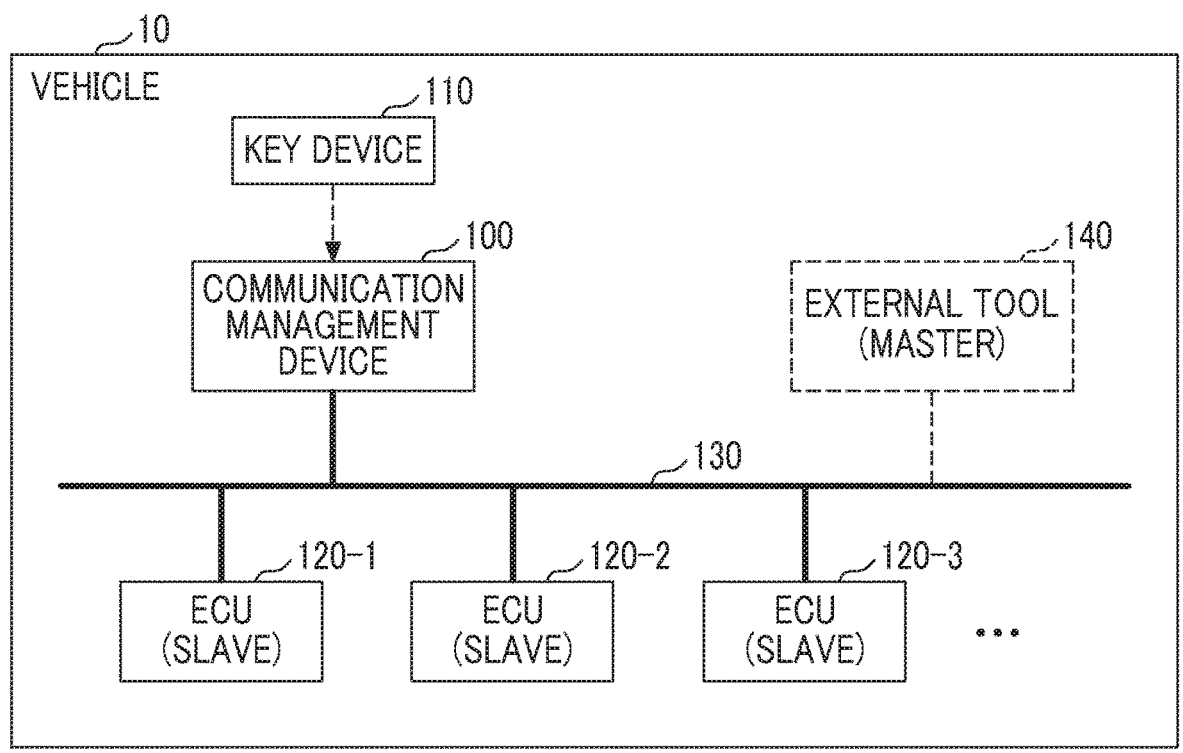
FIG. 1 is a diagram showing an example of a system configuration of an in-vehicle communication system according to an embodiment.

FIG. 1 is a diagram showing an example of the system configuration of an in-vehicle communication system according to an embodiment. For example, an in-vehicle communication system 1 is installed on a vehicle 10 such as an automobile. The in-vehicle communication system 1 includes a communication management device 100 and one or more electronic control units (ECUs) 120-1 to 120-3 which are connected to an in-vehicle network 130. In the following description, any ECU of one or more ECUs 120-1 to 120-3 is represented by an "ECU 120". The number of ECUs 120 shown in FIG. 1 is an example, and the number of ECUs 120 may be other numbers.

For example, the ECU 120 is mounted on the vehicle 10, and is an electronic control device that controls a predetermined function such as a vehicle control system, a body system, or a multimedia system. For example, the ECU 120 includes a central processing unit (CPU), a random-access memory (RAM), a flash read-only memory (ROM), and a communication interface, and controls the predetermined function by executing a predetermined program. For example, the ECU 120 is able to communicate with another device connected to the in-vehicle network 130 by using a predetermined communication protocol such a controller area network (CAN) or Universal Calibration Protocol (XCP).

For example, the ECU 120 functions as a slave of XCP (hereinafter, referred to as an "XCP slave"), and is able to perform XCP communication with a master of XCP (hereinafter, referred to as an XCP master) such as an external tool 140 connected to the in-vehicle network 130. The external tool 140 is an example of an external device.

XCP is an example of a measurement and calibration protocol for accessing one or more ECUs 120 mounted on the vehicle 10 to perform measurement or calibration by using the external tool 140 connected to the in-vehicle network 130. In XCP, a master/slave communication method is employed. Communication is performed in such a manner that the XCP master transmits a command and the XCP slave that receives the command transmits a response to the command.

In the in-vehicle network 130, the XCP may use various communication systems capable of distinguishing between the transmission from the XCP master to the XCP slave and the transmission from the XCP slave to the XCP master. For example, in the CAN, the XCP communication is able to be performed by allocating a CAN ID indicating the transmission from the XCP master to the XCP slave and a CAN ID indicating the transmission from the XCP slave to the XCP master.

For example, the ECU 120 can communicate with another ECU by using a communication protocol for an in-vehicle network such as the CAN. The ECU 120 may communicate with another ECU by using a communication protocol other than the CAN.

The communication management device (electronic control device) 100 is an electronic control device that is connected to the in-vehicle network 130 and restricts predetermined communication in the in-vehicle network 130. For example, the communication management device 100 has a function of restricting communication using an unauthorized external tool 140 connected to the in-vehicle network 130.

For example, when a communication frame including the CAN ID indicating the transmission from the XCP master to the XCP slave is detected in the in-vehicle network 130, the communication management device 100 generates an error frame within the communication frame. As stated above, the communication management device 100 can restrict the communication of the unauthorized external tool 140 connected to the in-vehicle network 130 with the ECU 120 using the XCP protocol.

However, in the aforementioned case, even when an authorized external tool 140 that performs communication by using the XCP protocol is connected to the in-vehicle network 130, there is a problem that communication is restricted.

The communication management device 100 according to the present embodiment has a key connection unit that accepts the connection of a key device 110, and permits predetermined communication (for example, XCP communication) in the in-vehicle network 130 when the key device 110 of an authorized user is connected to the key connection unit. As stated above, the communication management device 100 can permit communication when the authorized user having the key device 110 connects the authorized external tool 140 to the in-vehicle network 130 while maintaining the restriction of the communication for the unauthorized external tool 140 which is connected to the in-vehicle network 130 by the unauthorized user.

As mentioned above, the key device 110 according to the present embodiment has a function of permitting communication using the external tool 140 connected to the in-vehicle network 130. The key device 110 may have a function of permitting predetermined communication (for example, XCP communication) corresponding to the key device 110 among communications using the external tool 140 connected to the in-vehicle network 130. For example, the key device 110 may be an electronic key that stores predetermined information or may be a key that unlocks car doors based on a physical shape. Hereinafter, an example in which the key device 110 is the electronic key that stores the predetermined information will be described.

First Embodiment

Hardware Configuration

Figure 2:
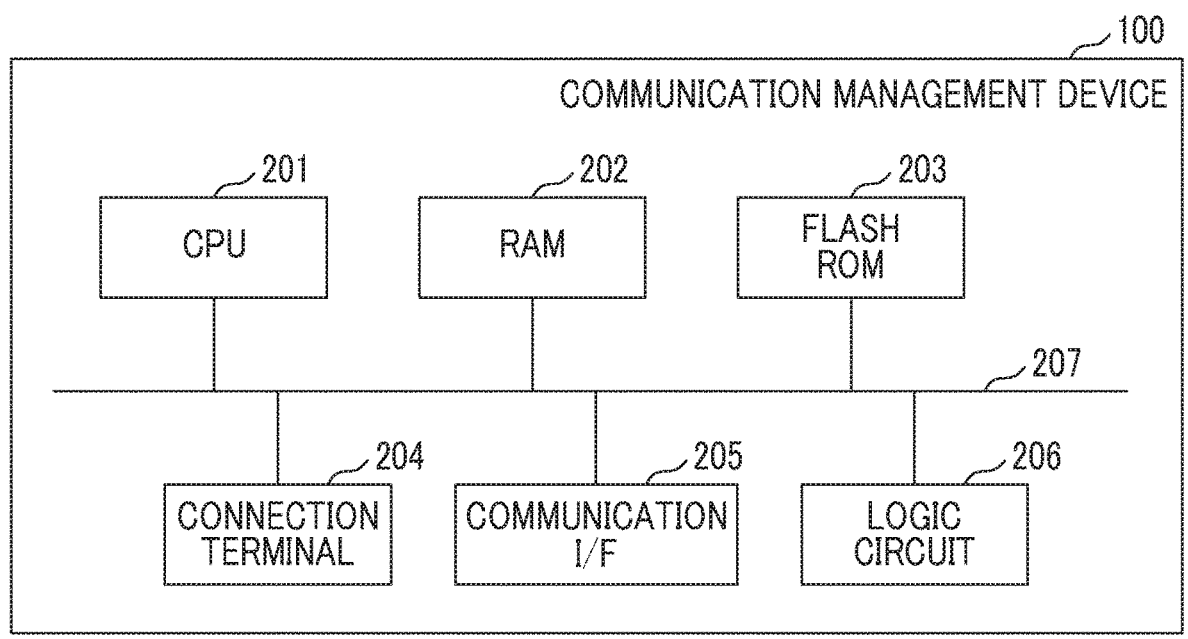
FIG. 2 is a diagram showing an example of a hardware configuration of a communication management device according to a first embodiment.

The hardware configuration of a communication management device 100 according to a first embodiment will be described. FIG. 2 is a diagram showing an example of the hardware configuration of the communication management device according to the first embodiment. For example, the communication management device 100 includes a CPU 201, a RAM 202, a flash ROM 203, a connection terminal 204, a communication I/F 205, a logic circuit 206, and a system bus 207.

The CPU 201 is an arithmetic operation device that realizes the functions of the communication management device 100 by reading a program or data stored in the flash ROM 203 into the RAM 202 and performing processing. The RAM 202 is a volatile memory used as a work area of the CPU 201. For example, the flash ROM 203 is a nonvolatile memory that stores an operating system (OS), programs, and various data items.

The connection terminal 204 is an interface for connecting the key device 110 to the communication management device 100. For example, when the key device 110 is a storage device that stores authentication information, the connection terminal 204 is a connector for electrically connecting the key device 110 to the communication management device 100. When the key device 110 is the key that unlocks the car doors based on the physical shape, the connection terminal 204 has a structure corresponding to the shape of the key device 110.

For example, the communication interface 205 (hereinafter, referred to as communication I/F 205) is a communication interface such as a CAN transceiver which connects the communication management device 100 to the in-vehicle network 130.

The logic circuit 206 is a logic circuit for realizing at least a part of the functions realized by the communication management device 100, and is realized by, for example, a dedicated integrated circuit or a programmable integrated circuit. The functions realized by the communication management device 100 may be realized by the program executed by the CPU 201 or may be realized by the logic circuit 206. The system bus 207 is connected in common to the aforementioned components, and transfers address signals, data signals, and various control signals.

Functional Configuration

The functional configuration of the communication management device 100 will be described. FIG. 3 is a diagram showing an example of the functional configuration of the communication management device according to the first embodiment.

For example, the communication management device 100 includes an identification code storage unit 301, an identification code detection unit 302, a comparison unit 303, an error frame generation unit 304, a communication unit 305, a key connection unit 306, a key verification unit 307, and a function controller 308.

For example, the identification code storage unit (storage unit) 301 is realized by a register included in the flash ROM 203 or the logic circuit 206 of FIG. 2, and stores an identification code corresponding to the predetermined communication restricted by the communication management device 100. For example, when the communication management device 100 restricts the XCP communication, the identification code storage unit 301 stores an identification code indicating the transmission from the XCP master to the XCP slave as mentioned above.

For example, the identification code detection unit 302 is realized by the program executed by the CPU 201 of FIG. 2 or the logic circuit 206, and detects the identification code included in the communication frame received by the communication unit 305. For example, when the communication unit 305 is the CAN transceiver, the identification code detection unit 302 detects the CAN ID included in the communication frame.

For example, the comparison unit 303 is realized by the program executed by the CPU 201 of FIG. 2 or the logic circuit 206. The comparison unit 303 compares the identification code detected by the identification code detection unit 302 with the identification code stored in the identification code storage unit 301, and outputs the comparison result to the error frame generation unit 304.

Here, a case where the comparison result output by the comparison unit 303 indicates that the two identification codes match each other means that the identification code corresponding to the predetermined communication is included in the communication frame received by the communication unit 305. Meanwhile, a case where the comparison result output by the comparison unit 303 indicates that the two identification codes do not match each other means that the identification code corresponding to the predetermined communication is not included in the communication frame received by the communication unit 305.

For example, the error frame generation unit 304 is realized by the program executed by the CPU 201 of FIG. 2 or the logic circuit 206. The error frame generation unit 304 generates an error in the communication frame when the comparison result output from the comparison unit 303 indicates that the identification code corresponding to the predetermined communication is included in the communication frame received by the communication unit 305. For example, when the communication unit 305 is the CAN transceiver, the error frame generation unit 304 transmits an error frame including an error flag constituted a 6-bit dominant within the communication frame.

Meanwhile, when the comparison result output from the comparison unit 303 indicates that the identification code corresponding to the predetermined communication is not included in the communication frame received by the communication unit 305, the error frame generation unit 304 does not generate the error in the communication frame.

For example, the communication unit (reception unit) 305 is realized by the program executed by the CPU 201 shown in FIG. 2 and the communication I/F 205, and performs the predetermined communication such as the CAN communication or the XCP communication. For example, the communication unit 305 functions as a reception unit that receives the communication frame transmitted to the in-vehicle network 130.

For example, the key connection unit 306 is realized by the connection terminal 204 of FIG. 2, and accepts the connection of the key device 110 to the communication management device 100.

For example, the key verification unit 307 is realized by the program executed by the CPU 201 of FIG. 2 or the logic circuit 206, and verifies whether or not the key device 110 connected to the key connection unit 306 is the authorized key device 110 when the key device 110 is connected to the key connection unit 306.

For example, when the key device 110 is the electronic key including an authentication information storage unit 311 that stores authentication information, the key verification unit 307 obtains the authentication information stored in the authentication information storage unit 311 from the key device 110, as shown in FIG. 3.

When the authentication information of the registered key device 110 is stored in the flash ROM 203 in advance and the authentication information obtained from the key device 110 is stored as the authentication information in the flash ROM 203, the verification of the key device 110 using the key verification unit 307 succeeds. Meanwhile, when the authentication information obtained from the key device 110 is not stored as the authentication information in the flash ROM 203, the verification of the key device 110 using the key verification unit 307 fails.

As another example, when the key device 110 is a key that unlocks the car doors by using the physical shape, the key verification unit 307 may verify the key device 110 depending on whether the unlocking using the key device 110 succeeds or fails.

For example, the function controller 308 is realized by the program executed by the CPU 201 of FIG. 2 or the logic circuit 206, and permits the predetermined communication restricted by the communication management device 100 when the verification of the key device 110 using the key verification unit 307 succeeds. For example, when the verification of the key device 110 using the key verification unit 307 succeeds, the function controller 308 stops the generation of the error using the error frame generation unit 304.

For example, as the method of stopping the generation of the error using the error frame generation unit 304, the function controller 308 may disable the comparison of the identification codes using the comparison unit 303. As the method of stopping the generation of the error using the error frame generation unit 304, the function controller 308 may disable the identification code stored in the identification code storage unit 301. In this case, the function controller 308 may disable at least one of the identification codes stored in the identification code storage unit.

Flow of Processing

A flow of a communication management method performed by the communication management device 100 according to the first embodiment will be described with reference to FIGS. 4 to 5B.

Figure 5A:
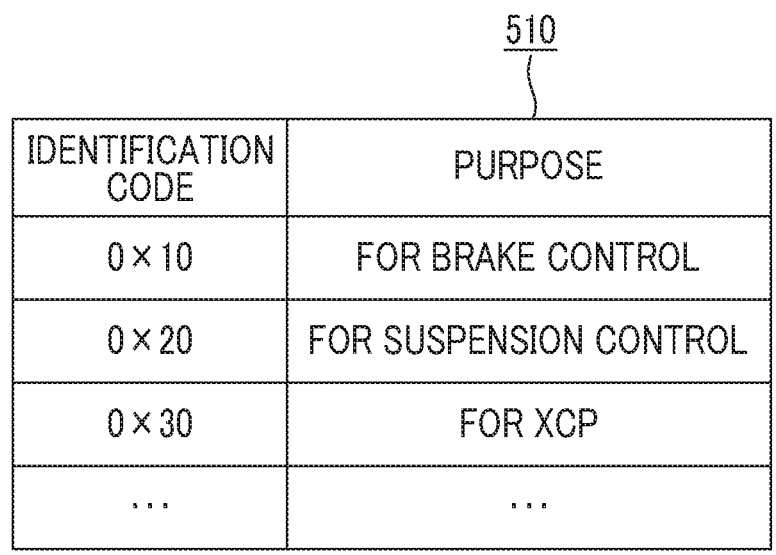
FIG. 5A is a table for describing an identification code according to the first embodiment.

For example, it is assumed that different identification codes are included in communication frames transmitted by the ECU 120 and the external tool 140 depending on the purpose of communication, as shown in the table 510 in FIG. 5A.

For example, when the ECU 120 transmits a communication frame for brake control, an identification code "0×10" is included in the communication frame to be transmitted. When the ECU 120 transmits a communication frame for suspension control, an identification code "0×20" is included in the communication frame to be transmitted.

When the external tool 140 transmits a communication frame for XCP, an identification code "0x30" is included in the communication frame to be transmitted.

Figure 5B:
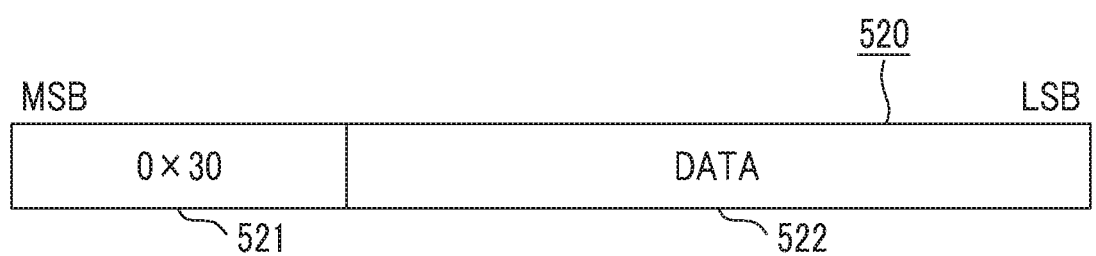
FIG. 5B is a table for describing the identification code according to the first embodiment.

As shown in FIG. 5B, it is assumed that the communication frame 520 has an identification code 521 ahead of data 522.

It is assumed that the communication management device 100 restricts the XCP communication performed by using the communication frame including the identification code "0x30". For example, the communication management device 100 generates the error in the communication frame by transmitting the error frame within the data 522 when "0x30" is included in the identification code 521 like the communication frame 520 shown in FIG. 5B.

FIG. 4 is a flowchart showing a flow of processing of the communication management device according to the first embodiment.

In step S401, when the communication unit 305 of the communication management device 100 receives the communication frame transmitted to the in-vehicle network 130, the communication management device 100 performs the processing in step S402 and the subsequent steps.

In step S402, the key verification unit 307 of the communication management device 100 determines whether or not the key device 110 is connected to the key connection unit 306. When the key device 110 is connected, the communication management device 100 moves the processing to step S403. Meanwhile, when the key device 110 is not connected, the communication management device 100 moves the processing to step S404.

When the processing is moved from step S402 to step S403, the key verification unit 307 of the communication management device 100 verifies the key device 110 connected to the key connection unit 306. For example, the key verification unit 307 reads the authentication information stored in the authentication information storage unit 311 from the key device 110 connected to the key connection unit 306, and verifies the key device 110 as success when the read authentication information is included in the authentication information of the registered key device 110 which is stored in advance.

When the verification of the key device 110 succeeds, the communication management device 100 moves the processing to step S406. Meanwhile, when the verification of the key device 110 does not succeed, the communication management device 100 moves the processing to step S404.

When the processing is moved to step S404, the comparison unit 303 of the communication management device 100 compares the identification code detected by the identification code detection unit 302 from the communication frame received by the communication unit 305 with the identification code stored in the identification code storage unit 301.

When the identification code detected by the identification code detection unit 302 and the identification code stored in the identification code storage unit 301 match each other, that is, when the received communication frame includes a predetermined identification code "0x30", the communication management device 100 moves the processing to step S405. Meanwhile, when the identification code detected by the identification code detection unit 302 and the identification code stored in the identification code storage unit 301 do not match each other, that is, when the received communication frame is not included in the predetermined identification code "0x30", the communication management device 100 ends the processing.

When the processing is moved to step S405, the error frame generation unit 304 of the communication management device 100 generates an error in the communication frame by transmitting the error frame in the communication frame received by the communication unit 305.

Meanwhile, when the processing is moved from step S403 to step S406, the function controller 308 of the communication management device 100 disables the identification code stored in the identification code storage unit 301 or disables the comparison of the identification codes using the comparison unit 303. As stated above, the communication management device 100 stops the processing for generating the error frame represented in steps S404 and 405.

Through the aforementioned processing, when the key device 110 is not connected to the communication management device 100 and the verification of the key device 110 does not succeed, the communication management device 100 generates the error in the communication frame including the predetermined identification code. As stated above, the communication management device 100 can restrict the predetermined communication (for example, XCP communication) using the external tool 140 when the unauthorized user who does not have the authorized key device 110 connects the external tool 140 to the in-vehicle network 130.

Meanwhile, when the key device 110 is connected to the communication management device 100 and the verification of the key device 110 succeeds, the communication management device 100 does not generate the error in the communication frame including the predetermined identification code. As stated above, the communication management device 100 can cancel the restriction of the predetermined communication using the external tool 140 when the authorized user having the authorized key device 110 connects the key device 110 to the communication management device 100.

Second Embodiment

In a second embodiment, an embodiment suitable for a case where the communication management device 100 is constituted by the logic circuit will be described.

Hardware Configuration

For example, a communication management device 100 according to the second embodiment may not include the CPU 201, the RAM 202, and the flash ROM 203 in the hardware configuration of the communication management device 100 according to the first embodiment shown in FIG. 2. For example, in the second embodiment, the functional configuration of the communication management device 100 shown in FIG. 6 is mainly realized by the logic circuit 206.

Functional Configuration

Figure 6:
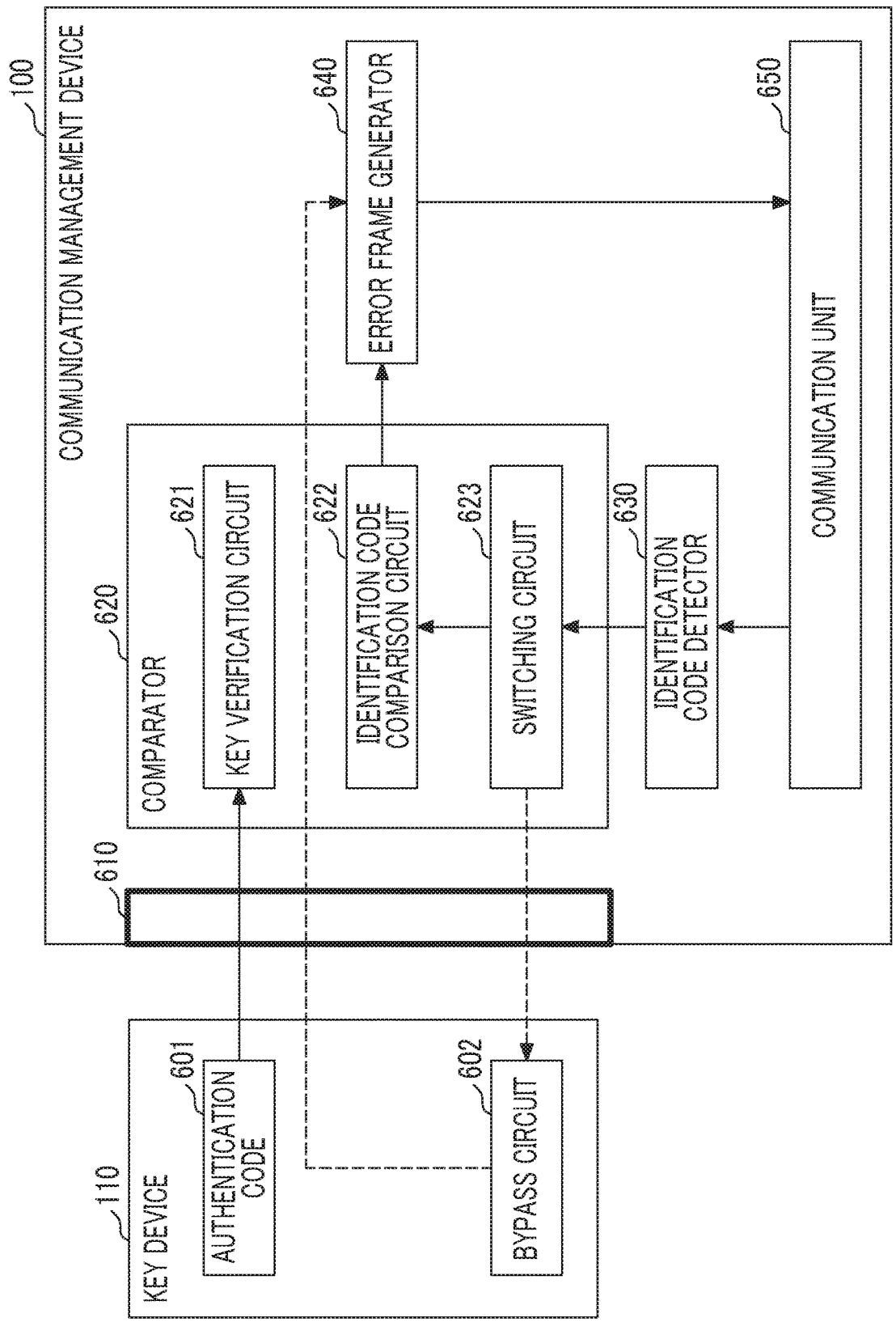
FIG. 6 is a diagram showing an example of a functional configuration of a communication management device and a key device according to a second embodiment.

FIG. 6 is an example of the functional configuration of the communication management device and a key device according to the second embodiment.

For example, the communication management device 100 includes a key connection unit 610, a comparator 620, an identification code detector 630, an error frame generator 640, and a communication unit 650.

For example, the key connection unit 610 is realized by the connection terminal 204 of FIG. 2, and accepts the connection of the key device 110.

The comparator 620 is realized by, for example, the logic circuit 206 of FIG. 2, and includes, for example, a key verification circuit 621, an identification code comparison circuit 622, and a switching circuit 623. The key verification circuit 621 and the switching circuit 623 may be provided outside the comparator 620. The switching circuit 623 may be included in an identification code comparison circuit 622.

When the key device 110 is connected to the key connection unit 610, the key verification circuit (key verification unit) 621 verifies the key device 110 connected to the key connection unit 610, and outputs the verification result to the switching circuit 623. For example, the key verification circuit 621 verifies the key device 110 by obtaining an authentication code 601 of the key device 110 and comparing the obtained authentication code with authentication information set in advance for the key verification circuit 621. Alternatively, the key connection unit 610 has a plurality of contact points for authenticating the key device 110, and the key verification circuit 621 may verify the key device 110 by comparing logical values of the contact points of the key device 110 connected to the key connection unit 610 with a preset logical value. The key verification circuit 621 is an example of the key verification unit.

The identification code comparison circuit (comparison unit) 622 has an identification code pattern as the logic circuit, and logically compares the identification code output from the identification code detector 630 for every bit. For example, it is possible to restrain the identification code from being disabled through the rewriting of the program, as stated above. When the bits of all the identification codes match through the logical comparison, the identification code comparison circuit 622 causes the error frame generator 640 to generate the error. The identification code comparison circuit 622 is an example of the comparison unit.

When the verification result from the key verification circuit 621 indicates that the verification of the key device 110 succeeds, the switching circuit (function controller) 623 disables the comparison of the identification code using the identification code comparison circuit 622, and enables a bypass circuit 602 of the key device 110. As mentioned above, the switching circuit 623 stops the generation of the error using the error frame generator 640. Meanwhile, when the verification result from the key verification circuit 621 indicates that the verification of the key device 110 fails, the switching circuit 623 enables the comparison of the identification code using the identification code comparison circuit 622. The switching circuit 623 is an example of the function controller.

For example, the identification code detector 630 is realized by the logic circuit 206 of FIG. 2. The identification code detector detects the identification code included in the communication frame received by the communication unit 650, and outputs the detected identification code to the comparator 620 for every bit.

For example, the error frame generator (generation unit) 640 is realized by the logic circuit 206 of FIG. 2, and generates the error within the communication frame in response to a control signal output from the identification code comparison circuit 622. The error frame generator 640 is an example of the generation unit.

The communication unit (reception unit) 650 is realized by, for example, the communication I/F 205 of FIG. 2, and performs the predetermined communication such as the CAN communication or the XCP communication. For example, the communication unit 650 functions as the reception unit that receives the communication frame transmitted to the in-vehicle network 130.

With the aforementioned configuration, when the key device 110 is not connected to the key connection unit 610 and the verification of the key device 110 fails, the comparator 620 enables the identification code comparison circuit 622. As stated above, when the communication frame received by the communication unit 650 includes a predetermined identification code, the comparator 620 generates the error in the error frame generator 640.

Meanwhile, when the key device 110 is connected to the key connection unit 610 and the verification of the key device 110 succeeds, the comparator 620 disables the comparison of the identification code using the identification code comparison circuit 622, and enables the bypass circuit 602. As mentioned above, the bypass circuit 602 of the key device 110 functions as a part of the comparator 620, and stops the generation of the error using the error frame generator 640.

For example, the key device 110 realizes the authentication code 601 and the bypass circuit 602 by using dedicated integrated circuits.

The authentication code 601 is information for authenticating the key device 110. The authentication code may be stored in a nonvolatile memory or may have the authentication code pattern as the logic circuit.

The bypass circuit 602 functions as a part of the comparator 620 according to the control of the switching circuit 623, and disables the function of the identification code comparison circuit 622 of the comparator 620 by bypassing the comparison of the identification code using the identification code comparison circuit 622.

Flow of Processing

A flow of a communication management method using the communication management device 100 according to the second embodiment will be described with reference to FIGS. 7 to 8C.

FIG. 7 is a flowchart showing a flow of processing of the communication management device according to the second embodiment. Similarly to the first embodiment, it is assumed that different identification codes are included in the communication frames transmitted by the ECU 120 and the external tool 140 depending on the purpose of communication.

In step S701, when the communication unit 650 receives the communication frame transmitted to the in-vehicle network 130, the communication management device 100 performs processing in step S702 and the subsequent steps.

In steps S702, S703, when the key device 110 is connected to the key connection unit 610, the key verification circuit 621 verifies the key device 110 connected to the key connection unit 610, and outputs the verification result to the switching circuit 623. The switching circuit 623 branches the processing according to the verification result output from the key verification circuit 621.

For example, when the verification of the key device 110 using the key verification circuit 621 succeeds, the switching circuit 623 moves the processing to step S706. Meanwhile, when the verification of the key device 110 using the key verification circuit 621 does not succeed, the switching circuit 623 moves the processing to step s704.

When the processing is moved to step S704, the identification code comparison circuit 622 determines whether or not the predetermined identification code is included in the communication frame received by the communication unit 650 by comparing the identification code detected by the identification code detector 630 for every bit.

For example, an identification code 811 and data 812 are included in a communication frame 810 received by the communication unit 650, as shown in FIG. 8A. It has been described in the first embodiment that the comparison unit 303 determines that there is the predetermined identification code with the entire identification code 811 as a unit of comparison. In the second embodiment, the identification code comparison circuit 622 determines whether or not there is the predetermined identification code with one bit as a unit of comparison. For example, the identification code comparison circuit 622 sequentially compares the identification code 811 output from the identification code detector 630 bit by bit with the identification code pattern as the logic circuit, and determines that the predetermined identification code is included in the communication frame when all the bits match.

When the predetermined identification code is included in the communication frame received by the communication unit 650, the identification code comparison circuit 622 transmits the error frame to the error frame generator 640 in step S705. For example, the error is generated in the data 812 of the communication frame 810 shown in FIG. 8A, and the communication frame 810 is disabled, as stated above. Meanwhile, when the predetermined identification code is not included in the communication frame received by the communication unit 650, the communication management device 100 ends the processing.

When the processing is moved from step S703 to step S706, the switching circuit 623 disables the comparison of the identification code using the identification code comparison circuit 622, and enables the bypass circuit 602 of the key device 110 connected to the key connection unit 610. For example, the switching circuit 623 switches an output destination of the identification code output from the identification code detector 630 from the identification code comparison circuit 622 to the bypass circuit 602.

For example, the bypass circuit 602 bypasses the comparison of the identification code using the identification code comparison circuit 622, and disables the comparison of the identification code using the identification code comparison circuit 622, as stated above.

Through the aforementioned processing, when the key device 110 is not connected to the communication management device 100 and the verification of the key device 110 does not succeed similarly to the first embodiment, the communication management device 100 generates the error in the communication frame including the predetermined identification code. As stated above, the communication management device 100 can restrict the predetermined communication (for example, XCP communication) using the external tool 140 when the unauthorized user who does not have the authorized key device 110 connects the external tool 140 to the in-vehicle network 130.

Similarly to the first embodiment, when the key device 110 is connected to the communication management device 100 and the verification of the key device 110 succeeds, the communication management device 100 does not generate the error in the communication frame including the predetermined identification code. As stated above, the communication management device 100 can cancel the restriction of the predetermined communication using the external tool 140 when the authorized user having the authorized key device 110 connects the key device 110 to the communication management device 100.

As another example, in step S706 of FIG. 7, the bypass circuit 602 of the key device 110 may disable a part of the function of the identification code comparison circuit 622.

For example, it is assumed that the identification code comparison circuit 622 has a pattern of an identification code "0×30" for a first communication protocol and a pattern of an identification code "0×31" for a second communication protocol, which are shown in FIG. 8B, as the logic circuits.

Meanwhile, the bypass circuit 602 has the pattern of the identification code "0×31" for the second communication protocol as the logic circuit, and logically compares the identification code output from the identification code detector 630 for every bit, as shown in the table 820 in FIG. 8B or in the table 830 in FIG. 8C. When all the bits of the identification code match through the logical comparison, the bypass circuit 602 generates the error in the error frame generator 640.

As stated above, the key device 110 is connected to the communication management device 100, and thus, solely the communication using the predetermined communication protocol among a plurality of communication protocols restricted by the communication management device 100 may be permitted.

According to the aforementioned embodiments of the disclosure, it is possible to permit the communication using the authorized external device while restricting the communication using the unauthorized external tool 140 even on a communication path without using a relay apparatus in the in-vehicle network 130.

While the embodiments of the disclosure have been described, the disclosure is not limited to the aforementioned embodiments, and may be modified and changed in various manners without departing from the gist of the disclosure described in the claims.

What is claimed is:

1. An electronic control device that is connected to an in-vehicle network and is configured to restrict a predetermined communication in the in-vehicle network, the electronic control device comprising a central processing unit (CPU), and the CPU is programmed to
   accept connection of a key device;
   verify the key device;
   permit the predetermined communication in the in-vehicle network when the verification of the key device succeeds;
   receive a communication frame transmitted to the in-vehicle network; and
   generate an error in the communication frame when an identification code corresponding to the predetermined communication is included in the communication frame,
   wherein the key device is an electronic key that stores predetermined information or a key that unlocks car doors based on a physical shape.

2. The electronic control device according to claim 1, wherein the key device is configured to permit communication using an external device connected to the in-vehicle network.

3. The electronic control device according to claim 1, wherein the key device is configured to permit the predetermined communication corresponding to the key device among communications using an external device connected to the in-vehicle network.

4. The electronic control device according to claim 1, wherein the predetermined communication includes universal calibration protocol communication.

5. The electronic control device according to claim 1, wherein the CPU is further programmed to
   stop the generation of the error when the verification of the key device succeeds.

6. The electronic control device according to claim 5, wherein the CPU is further programmed to
   perform a comparison of the identification code included in the received communication frame with the identification code corresponding to the predetermined communication, and output a result of the comparison; and disable the comparison of the identification codes when the verification of the key device succeeds.

7. The electronic control device according to claim 6, wherein the key device includes a bypass circuit configured to bypass a determination of the comparison; and the CPU is further programmed to enable the bypass circuit when the verification of the key device succeeds.

8. The electronic control device according to claim 5, wherein the CPU is further programmed to store an identification code corresponding to the predetermined communication; and disable at least a part of stored identification codes when the verification of the key device succeeds.

9. A communication management method performable by an electronic control device connected to an in-vehicle network and restricts predetermined communication in the in-vehicle network, the communication management method comprising:

verifying a key device connected to the electronic control device;

permitting the predetermined communication in the in-vehicle network when the verification of the key device succeeds;

receiving a communication frame transmitted to the in-vehicle network; and generate an error in the communication frame when an identification code corresponding to the predetermined communication is included in the communication frame, wherein the key device is an electronic key that stores predetermined information or a key that unlocks car doors based on a physical shape.

10. A non-transitory storage medium storing a program executable by an electronic control device which is connected to an in-vehicle network and is configured to restrict predetermined communication in the in-vehicle network, the program comprising:

logic to verify a key device connected to the electronic control device;

logic to permit the predetermined communication in the in-vehicle network when the verification of the key device succeeds;

logic to receive a communication frame transmitted to the in-vehicle network; and logic to generate an error in the communication frame when an identification code corresponding to the predetermined communication is included in the communication frame, wherein the key device is an electronic key that stores predetermined information or a key that unlocks car doors based on a physical shape.

* * * * *